UNITED STATES PATENT OFFICE.

FILIPPO TOLENTINI, OF WOODLAWN, PENNSYLVANIA, ASSIGNOR TO PASQUALE W. COMO, OF WOODLAWN, PENNSYLVANIA.

OINTMENT AND PROCESS OF PREPARING SAME.

1,314,444.     Specification of Letters Patent.     Patented Aug. 26, 1919.

No Drawing.     Application filed May 8, 1919. Serial No. 295,693.

*To all whom it may concern:*

Be it known that I, FILIPPO TOLENTINI, a subject of the King of Italy, residing at Woodlawn, in the State of Pennsylvania, have invented new and useful Improvements in Ointments and Processes of Preparing Same, of which the following is a specification.

The present invention relates to an ointment for the treatment of skin affections, and to a process of preparing the same from its ingredients.

In the preferred form of my invention, I first prepare an oily material containing certain of the active principles of peppermint leaves as follows:

I place 40 grams of the fresh peppermint leaves in one liter of olive oil, preferably virgin olive oil, and allow the same to stand for about 48 hours, while maintaining the temperature as near as possible at 50° Ré. During this period the mixture of oil and leaves may be agitated from time to time. At the expiration of 48 hours, the oil is drained off as thoroughly as possible, and the leaves preferably slightly pressed in order to remove as much as possible of the oily material. This procedure extracts certain only of the constituents of the leaves, but does not extract the ingredients which would be harmful to the skin. The infusion in oil may be filtered if desired to remove all fine particles of undissolved material.

This liquid is then mixed with very fine and very light magnesium oxid (magnesia usta), which must be in a very fine and very light condition. The proportions of these two ingredients are such as to produce a paste of a soft-buttery consistency forming the product.

The ointment is applied to the affected portions of the skin by smearing on the same in the usual manner which may be protected by cloths or bandages in the well known way.

What I claim is:

1. An ointment suitable for the treatment of skin affections by local application, such ointment consisting essentially of a pasty mass containing light magnesia usta, olive oil and such constituents of peppermint leaves as are soluble in olive oil.

2. The process of preparing an oil-base medicament which comprises mixing together liquid fatty oil and peppermint leaves and maintaining the same at a temperature of about 50° Ré., for about 48 hours, and thereafter separating the oily material from the undissolved residue, and mixing with sufficient light magnesia usta to form a pasty mass.

In testimony whereof I affix my signature.

FILIPPO TOLENTINI.